US012296299B2

(12) United States Patent
Sibener et al.

(10) Patent No.: US 12,296,299 B2
(45) Date of Patent: May 13, 2025

(54) ISOTOPOLOGUE OR ISOTOPE ENRICHMENT VIA PREFERENTIAL CONDENSATION OF ISOTOPOLOGUES OR ISOTOPES UNDER NON-EQUILIBRIUM GAS-SURFACE COLLISION CONDITIONS

(71) Applicant: THE UNIVERSITY OF CHICAGO, Chicago, IL (US)

(72) Inventors: Steven J. Sibener, Chicago, IL (US); Michelle R. Brann, Chicago, IL (US); Stephen P. Hansknecht, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 550 days.

(21) Appl. No.: 17/728,453

(22) Filed: Apr. 25, 2022

(65) Prior Publication Data
US 2022/0355248 A1 Nov. 10, 2022

Related U.S. Application Data

(60) Provisional application No. 63/182,204, filed on Apr. 30, 2021.

(51) Int. Cl.
*B01D 59/34* (2006.01)
*B01D 59/02* (2006.01)

(52) U.S. Cl.
CPC .......... *B01D 59/34* (2013.01); *B01D 59/02* (2013.01)

(58) Field of Classification Search
CPC .............................. B01D 59/34; B01D 59/02
See application file for complete search history.

(56) References Cited

U.S. PATENT DOCUMENTS

| 4,025,790 | A | 5/1977 | Jetter et al. |
| 4,119,509 | A | 10/1978 | Szoke |
| 4,199,679 | A | 4/1980 | Ami-Rav |
| 2014/0245885 | A1 | 9/2014 | Rowe et al. |
| 2020/0139302 | A1* | 5/2020 | Sibener ............... B01D 59/34 |
| 2022/0143551 | A1* | 5/2022 | Sibener ............... B01D 59/26 |

FOREIGN PATENT DOCUMENTS

| WO | WO 2018/213549 A1 | 11/2018 |
| WO | WO 2019/032223 A2 | 2/2019 |

OTHER PUBLICATIONS

King, David A., and Michael G. Wells. "Molecular beam investigation of adsorption kinetics on bulk metal targets: Nitrogen on tungsten." *Surface Science* 29.2 (1972): 454-482.
(Continued)

*Primary Examiner* — Brian W Cohen
*Assistant Examiner* — Nathanael Jason Downes
(74) *Attorney, Agent, or Firm* — Bell & Manning, LLC (57) ABSTRACT

Provided are apparatus and methods for enriching and separating isotopologues or isotopes. The apparatus and methods enrich and/or separate isotopes or isotopologues present in a substantially monovelocity supersonic beam incident upon a solid surface comprising condensed forms of the isotopologues or the isotopes via the differential condensation of the different isotopologues or isotopes on the surface or the differential reflection of the different isotopologues or isotopes from the surface.

11 Claims, 7 Drawing Sheets

Lower deck     Upper deck

(56) References Cited

OTHER PUBLICATIONS

Gibson, K. D., et al. "Determination of the sticking coefficient and scattering dynamics of water on ice using molecular beam techniques." *The Journal of Chemical Physics* 134.3 (2011): 034703.

Carlsson, A. F., and R. J. Madix. "Alkane trapping onto structured alkane monolayers on Pt (111) at low temperature." *The Journal of Physical Chemistry B* 104.51 (2000): 12237-12249.

Carlsson, A. F., and R. J. Madix. "Trapping of Ar on well ordered Ar, Kr, and Xe overlayers on Pt (1 1 1) at 30 K." *Surface science* 470.1-2 (2000): 62-80.

Carlsson, A. F., and R. J. Madix. "The dynamics of argon and methane trapping on Pt (111) at 30 and 50 K: energy scaling and coverage dependence." *Surface science* 458.1-3 (2000): 91-105.

Head-Gordon, Martin, and John C. Tully. "Competition between static and dynamical effects in adsorption: sticking of Ar on Ar-covered Ru (001)." *Surface science* 268.1-3 (1992): 113-126.

Braun, J., et al. "Structure and phonons of the ice surface." *Physical review letters* 80.12 (Mar. 23, 1998); pp. 2638-2641.

Maki, Kazuo, and Michael L. Klein. "Phonon spectra of methane physisorbed on graphite." *The Journal of Chemical Physics* 74.2 (1981): 1488-1494.

Rebecca S. Thompson et al., Sticking Probability of High-Energy Methane on Crystalline, Amorphous, and Porous Amorphous Ice Films, *J. Phys. Chem. C* 2019, 123; pp. 17855-17863.

P. Morten Hundt et al., "The sticking probability of $D_2O$-water on ice: Isotope effects and the influence of vibrational excitation," *Journal of Chemical Physics*, American Institute of Physics, 2012, 137, pp. 074701. 10.1063/1.4742914. hal-00834749.

A.I. Krivchikov et al., "Orientational isotopic effects in the thermal conductivity of $CH_4/CD_4$ solid solutions," *Fizika Nizkikh Temperatur*, 2007, v. 33, No. 12, p. 1393-1400.

V. Celli et al., "Multiphonon Processes in Atom-Surface Scattering," *Physical Review Letters* Jun. 17, 1991, vol. 66, No. 24; pp. 3160-3163.

Presentation given by Steve Sibener at University of Rochester on Jun. 15, 2018.

The International Search Report and the Written Opinion issued on Jan. 25, 2019 for international application No. PCT/US2018/040609; pp. 1-7.

Nihill et al., "Separation of Isotopes in Space and Time by gas-Surface Atomic Diffraction," *Physical Review Letters*, vol. 119, 176001, Oct. 23, 2017 [retrieved on Jan. 4, 2019]. Retrieved from the Internet: <URL: https://sibner-group.uchicago.edu/docs/pubs/175.pdf.

* cited by examiner

ISOTOPOLOGUE OR ISOTOPE ENRICHMENT VIA PREFERENTIAL CONDENSATION OF ISOTOPOLOGUES OR ISOTOPES UNDER NON-EQUILIBRIUM GAS-SURFACE COLLISION CONDITIONS

CROSS-REFERENCE TO RELATED APPLICATIONS

The present application claims priority to U.S. provisional patent application No. 63/182,204 that was filed Apr. 30, 2021, the entire contents of which are incorporated herein by reference.

REFERENCE TO GOVERNMENT RIGHTS

This invention was made with government support under grant number FA9550-19-1-0324 awarded by Air Force Office of Scientific Research and grant number 1900188 awarded by National Science Foundation. The government has certain rights in the invention.

BACKGROUND

Proposals for separating and enriching isotopes came about almost immediately after isotopes were discovered. In 1919, Lindemann and Aston examined a vast array of possible methods including fractional distillation, chemical separation, gaseous diffusion, and gravitational and centrifugal separation, along with separation of positive ions with electric and magnetic fields. (See, F. A. Lindemann, et al. XLVIII. The possibility of separating isotopes. *Philos. Mag. Ser.* 6. 37, 523-534 (1919).) Their early analysis concluded that isotopes "must be separable in principle though possibly not in practice." Today, isotope separation and enrichment underpin advanced technologies in a wide variety of fields, including isotopic labeling in medicine, energy, and quantum computing.

Gaseous diffusion, distillation, and gas centrifuges exhibit small isotopic separation effects which are overcome through large scale installations where many separation steps are performed in sequence. Alternatively, laser-based techniques such as atomic vapor laser isotope separation (AVLIS) and magnetically activated and guided isotope separation (MAGIS) can separate isotopes to a much higher degree, but require ionization or excitation of the target isotope. (See, T. R. Mazur, B. Klappauf, M. G. Raizen, Demonstration of magnetically activated and guided isotope separation. *Nat. Phys.* 10, 601-605 (2014); P. A. Bokhan et al., *Laser Isotope Separation in Atomic Vapor* (2006).)

BRIEF DESCRIPTION OF THE DRAWINGS

Illustrative embodiments of the invention hereafter will be described with reference to the accompanying drawings.

Other principal features and advantages of the invention will become apparent to those skilled in the art upon review of the following drawings, the detailed description, and the appended claims.

DETAILED DESCRIPTION

Provided are apparatus and methods for enriching and separating isotopologues and/or isotopes from a supersonic beam comprising two or more isotopologues and/or two or more isotopes. The apparatus and methods utilize the narrow velocity distribution of a high Mach number supersonic beam where, essentially, all components entrained in the supersonic flow travel with the same velocity. Different isotopologues and/or different isotopes collide with a condensed film of the isotopologue mixture or the isotope mixture with differing impact energies due to their differing atomic masses. The apparatus and methods may be used to enrich or separate isotopologues or isotopes based on the differential condensation or reflection of the isotopologues and/or isotopes.

Because the probability of gaseous condensation depends on the incident gas-surface collision energy, the supersonic conditions result in differential condensation (and reflectivity) of the different isotopologues or isotopes due to differences in the energy exchanged between the surface and the different isotopologues or isotopes entrained within the monovelocity, or nearly monovelocity, incident supersonic beam. The methods described herein take advantage of these differences in energy exchange. Key to the enrichment and separation methods described herein is the inventors' discovery that the ratio of the isotopologues and isotopes in the condensed films can be tailored to provide the condensed film with a phonon density of states and, in the case of isotopologue condensation, a rovibrational density of states, that provides preferential condensation of one isotopologue with respect to other isotopologues or preferential condensation of one isotope with respect to other isotopes. Because the condensed film is formed from the incident supersonic beam, the extent of the enrichment and separation for a given isotopologue and/or isotope can be tailored by adjusting the ratio of the different isotopologues or isotopes in the incident supersonic beam, as well as their incident velocity.

In the methods for enriching or separating isotopologues, a substantially monovelocity supersonic beam containing a first isotopologue of a first molecule and a second, heavier, isotopologue of the first molecule is directed onto a surface containing the condensed forms of the first and second isotopologues. The methods are carried out with supersonic beam isotopologue ratios, incident supersonic beam velocities, incident supersonic beam angles, and surface temperatures at which the heavier isotopologue is preferentially condensed onto the surface relative to the lighter isotopologue and, conversely, the lighter isotopologue is preferentially reflected from the surface of the film formed from the condensed mixed gas, relative to the heavier isotopologue. The methods further include the step of collecting and isolating the heavier isotopologue from the surface condensate, the lighter isotopologue from the gas scattered from the surface, or both.

Analogous methods can be used to enrich or separate isotopes. Thus, in the methods for enriching or separating isotopes, a substantially monovelocity supersonic beam containing a first isotope of a first element and a second, heavier, isotope of the first element is directed onto a surface containing the condensed forms of the first and second isotopes. The methods are carried out with supersonic beam isotope ratios, incident supersonic beam velocities, incident supersonic beam angles, and surface temperatures at which the heavier isotope is preferentially condensed onto the surface relative to the lighter isotope and, conversely, the lighter isotope is preferentially reflected from the surface of the film formed from the condensed mixed gas, relative to the heavier isotope. The methods further include the step of collecting and isolating the heavier isotope from the surface condensate, the lighter isotope from the gas scattered from the surface, or both.

The surface, which comprises a steady-state mixture of the incident isotopologues (or isotopes) entrained within the supersonic beam, can be formed rapidly on an underlying support substrate via the initial condensation of the entrained isotopologues (or isotopes) in the supersonic beam. After a short time, the composition of the growing surface film will reach a steady state and its composition will reflect the preferential condensation of the heavier isotopologue or isotope. In order to form a condensed film that provides preferential condensation of the heavier isotope or isotopologue, it may be necessary to alter the atomic ratio of the isotopes or the molecular ratio of the isotopologues in the supersonic beam relative to their naturally occurring ratios (i.e., on Earth). This is particularly true in situations where a heavier atomic isotope is present in only a trace amount in nature relative to its lighter counterpart. Thus, in some embodiments of the methods that use a mixture of isotopologues in the supersonic beam, the ratio of isotopologues comprising a heavier isotope of an atom to isotopologues comprising a lighter isotope of that atom is higher than the naturally occurring ratio. Similarly, in some embodiments of the methods that use a mixture of isotopes in the supersonic beam, the ratio of heavier isotope to lighter isotope is higher than the naturally occurring ratio. The extent to which the isotopologue or isotope ratio in the supersonic beam and the condensed film will differ from the naturally occurring ratio will depend on the particular isotopologues and isotopes being used, their respective natural abundances, and the incident beam velocity. By way of illustration, in various embodiments the supersonic beams and/or the steady-state condensed films, molar ratio of isotopologues or the atomic ratio of isotopes may differ from their naturally occurring ratios by at least 10%, at least 100%, at least 1000%, at least 10,000%, or more (e.g., 10% to 10,000%). The ratios in the supersonic beams and the steady-state condensed films may be higher or lower than the naturally occurring ratios.

The material of the support substrate on which the condensed film is formed is not particularly limited, but should be selected to allow for cooling to a temperature at or below the condensation temperature of the material (isotope or isotopologue) to be enriched or separated. In order to maintain the support substrate and the overlying condensed film at a temperature sufficiently low that the isotopologues or isotopes continue to condense, the support substrate may be placed in thermal contact with a cooler, such as a cryogenic cooler.

The supersonic beam may be continuous or pulsed, or modulated, for example, via mechanical chopping. The supersonic expansion may be free or may be passed through an aperture, such as a skimmer or collimator, before it strikes the surface. This skimming effect will cause a slight enrichment of the heavier isotopologue or isotope present in the beam before it strikes the surface, as the heavier isotopologue or isotope is preferentially concentrated toward the centerline of the supersonic beam during the expansion. This skimming effect, which may influence the composition of the incident beam under favorable expansion conditions, can therefore be used advantageously to further increase the desired enrichment.

Figure 1:
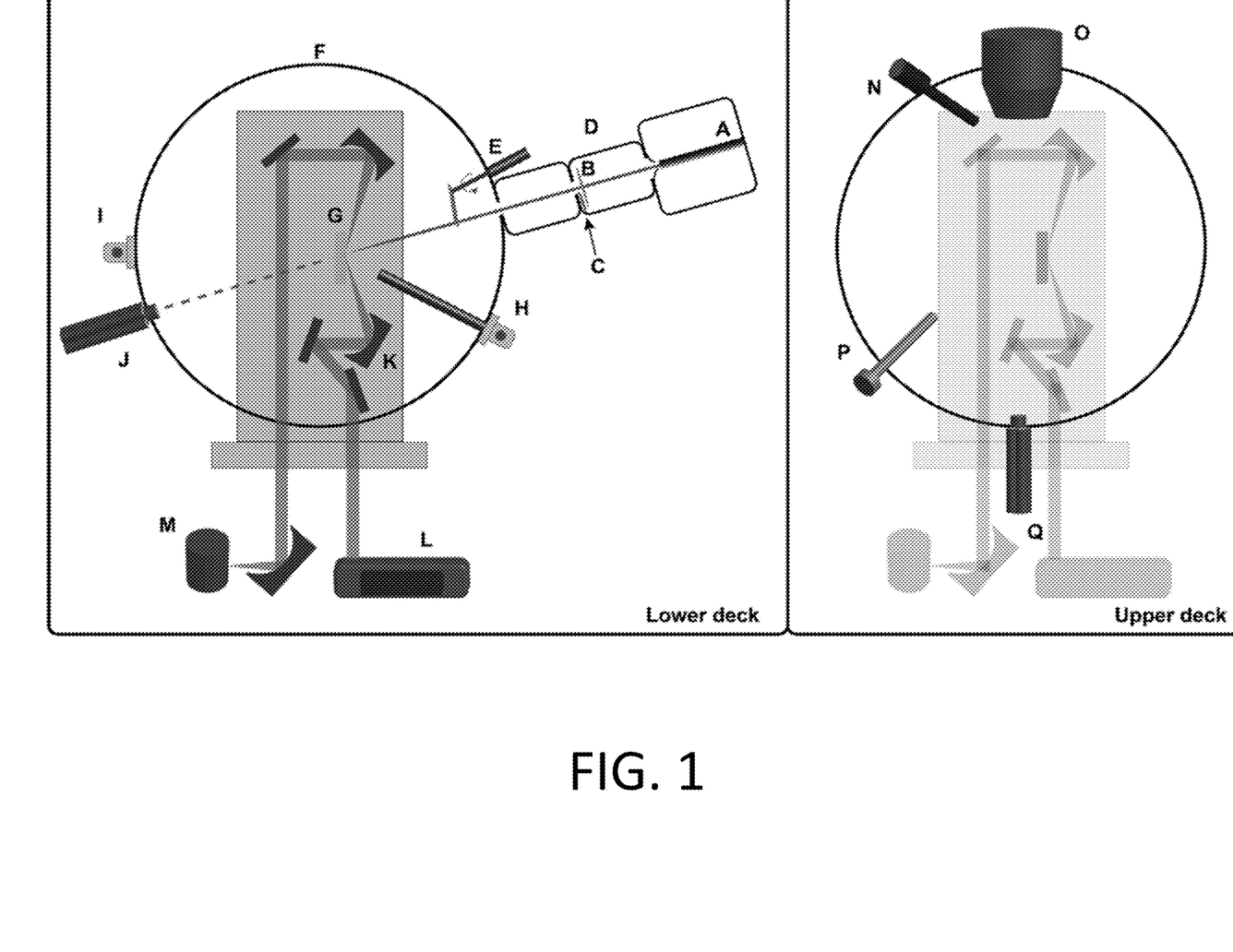
FIG. 1 shows a schematic of an apparatus that can be used to carry out the methods described herein, including a UHV main chamber. The lower layer (left) is used for RAIRS and molecular beam exposure. The upper level (right) is used for XPS, sputtering, and mass spectrometry. The components are as follows: A—Molecular beam source; B—Chopper (beam modulation); C—Flag for timing exposure; D—Differential pumping; E—Rotatable flag; F—UHV chamber; G—Au(111) sample; H—Directed doser; I—Leak valve; J—Inline QMS; K—RAIRS optics; L—FTIR spectrometer; M—MCT/A detector; N—X-ray source; O—Cylindrical mirror analyzer; P—Ion gun for sputtering; and Q—Residual gas analyzer.

One example of an ultra-high vacuum (UHV) scattering apparatus that can be used to carry out the methods is shown schematically in FIG. 1. Generally, it is composed of three components: a differentially pumped supersonic beam source, a chamber that houses the support substrate, and one or more analytical probes, such as an infrared spectrometer or mass spectrometer.

Experimentally, the sticking probability for an isotopologue (or isotope) can be measured using the King and Wells technique, where $$S = \frac{(P_2 - P_3)}{(P_2 - P_1)},$$

$P_1$ is the background signal for the isotopologue (or isotope), $P_2$ is the full flux of the isotopologue (or isotope) with a flag blocking the substrate, and $P_3$ is the surface adsorption of the isotopologue (or isotope) with the flag removed. Such measurements are demonstrated in the Example.

As discussed above, the absolute sticking coefficient can be controlled by adjusting the ratio of the isotopologues (or isotopes) in the incident supersonic beam, the incident kinetic energy of the supersonic beam, the incident angle of the supersonic beam, and/or the temperature of the surface. By way of illustration, heating the nozzle and/or seeding the isotopologues (or isotopes) in a low molecular weight carrier gas (such as helium or hydrogen) will increase the kinetic energy of the supersonic beam and lower the absolute sticking coefficient. Conversely, cooling the nozzle and/or seeding the isotopes in a high molecular weight carrier gas (such as xenon) will increase the absolute sticking coefficient. Additionally, the sticking coefficient can be modified by the angle of incidence; a more glancing angle of incidence will produce a lower sticking coefficient than an angle of incidence more perpendicular to the plane of the surface. As sticking coefficients are highly system dependent, a precise sticking coefficient as a function of isotopologue (or isotope) ratios, gas temperature, angle of incidence, and surface temperature may be determined experimentally. The velocity of the seeded beam is not highly dependent on the concentration of the carrier gas, (e.g., helium). If one wants to tune the velocity precisely, then a variable temperature nozzle is preferably used to heat or cool a given seed gas/carrier gas combination. The expansion is isenthalpic, so the overall kinetic energy is predictable in the gas mixture. For example, pure helium has a kinetic energy that is predicted by thermodynamics. Mixing in a low percentage of the substance to be enriched with the helium results in a beam with a velocity close to that of pure helium. More precisely, one can calculate using a weighted average of the heat capacity of the carrier gas plus that of the seed gas. Therefore, it is preferable to tune the energy of the beam by nozzle temperature for a given composition rather than by composition. This allows one to broadly tune the incident kinetic energy. For different regions, one might use Hz, He, or Ne, for example, as the seed gas with temperature tuning used for overall energy control. See equation 8 of "Development of a Supersonic $P(^3P_j)$, $O(^1D_2)$ Nozzle Beam Source," S. J. Sibener, R. J. Buss, C. Y. Ng, and Y. T. Lee, Rev. Sci. Instrum. 51, 167-182 (1980).

For the enrichment or separation of any given isotope or isotopologue, once a vacuum condensation temperature is obtained, one can optimize the conditions by, for example, changing the ratio of the isotopologues or isotope in the incident beam or decreasing the beam velocity from a high velocity (i.e., higher nozzle temperature), while keeping the substrate at a fixed temperature below the vacuum condensation temperature and observing the beam velocity at which the material first condenses. One can then adjust isotopologue or isotope ratio in the beam and/or the beam velocity to find a point of maximum enrichment of the condensate and/or scattered material, depending on the desired product. The substrate temperature may also be varied, but the effect on the amount of enrichment is expected to be smaller.

The supersonic beam may be generated by a variety of atomic beam sources configured to supersonically expand a gas through a variable temperature nozzle. The gas comprises the first and second isotopologues (or isotopes) in a selected ratio. By "first and second isotopologue" it is meant two forms of the same molecule, wherein one or more atoms of the first isotopologue have equal numbers of protons but different numbers of neutrons relative to the corresponding atoms of the second isotopologue. Similarly, by "first and second isotope" it is meant two forms of the same element that contain equal numbers of protons but different numbers of neutrons. The gas may comprise additional (i.e., more than two) isotopologues and/or isotopes, each of which may be enriched or separated using the method.

Straightforward collection techniques used for molecular beam apparatus can be employed to collect condensed and reflected fractions of the isotopologues (or isotopes). By way of illustration, the scattered gas can pass through an aperture which leads to a separate vacuum chamber that is pumped by a high vacuum pump, where the exhaust of the high vacuum pump contains the reflected portion enriched in the lighter isotope. Additionally, the condensed portion can be collected by periodically warming the condensate above its condensation temperature. As the condensed portion desorbs and enters the gas phase, the exhaust of the chamber's high vacuum pump will be enriched in the heavier isotope (or isotopologue). The isotopologues (or isotopes) collected from both the condensed portion and the reflected portion can separately be recompressed with a mechanical compressor. Once recompressed, each portion can be further enriched through subsequent passes (e.g., 2, 10, 100, 1000, or more passes) through the enrichment method until a desired level of enrichment is obtained.

The types of isotopologues and/or isotopes that can be enriched and separated by the methods described herein are not particularly limited. However, because the enrichment and separation are higher for isotopologues (or isotopes) having molecular weights that differ by a greater percentage, the methods are more effective for lower molecular weight isotopologues and isotopes. In addition, because molecules have more degrees of freedom than atoms and are, therefore, more efficient at energy transfer, the methods are particularly useful for the enrichment and separation of isotopologues.

Illustrative examples of isotopologues that can be enriched or separated by these methods include but are not limited to: $^6$LiH and $^7$LiH; $^{12}$CH$_4$ and $^{13}$CH$_4$; $^{28}$SiH$_4$ and $^{29}$SiH$_4$; $^{28}$SiF$_4$ and $^{29}$SiF$_4$; two or more of H$_2$, HD, HT, D$_2$, DT, and T$_2$; two or more of $^1$H$_2$$^{16}$O, $^1$H$^2$H$^{16}$O, $^2$H$_2$$^{16}$O, $^1$H$_2$$^{16}$O, and $^1$H$_2$$^{18}$O; $^{16}$O$_2$ and $^{18}$O$_2$; $^{14}$N$_2$ and $^{15}$N$_2$; HBr and DBr; HCl and DCl; HI and DI; H$_2$S and D$_2$S; two or more of CH$_3$F, CD$_3$F, $^{13}$CH$_3$F, and $^{13}$CD$_3$F; two or more of CH$_3$Cl, CD$_3$Cl, $^{13}$CH$_3$Cl, and $^{13}$CD$_3$Cl; two or more of $^{13}$C$^{16}$O$_2$, $^1$C$^{16}$O$_2$, $^{13}$C$^{18}$O$_2$, and $^{12}$C$^{18}$O$_2$; two or more of $^{12}$C$^{18}$O, $^{13}$C$^{18}$O, $^{13}$C$^{16}$O, and $^{13}$C$^{18}$O; two or more of NH$_3$, $^{15}$NH$_3$, ND$_3$, and $^{15}$ND$_3$; NO and $^{15}$NO; two or more of $^{14}$N$_2$O, $^{15}$N$^{14}$NO, and $^{15}$N$_2$O; two or more of PH$_3$ and PD$_3$; COS and $^{13}$COS; CHCl$_2$F and CDCl$_2$F; two or more of $^{12}$CH$_2$F$_2$, $^{13}$CH$_2$F$_2$, $^{12}$CD$_2$F$_2$, and $^{13}$CD$_2$F$_2$; two or more of CH$_3$Br, $^{13}$CH$_3$Br, and CD$_3$Br; two or more of $^{12}$C$_3$H$_6$, $^{12}$C$_3$D$_6$, $^{13}$C$_3$H$_6$, and $^{12}$C$_3$H$_4$D$_2$; two or more of $^{12}$CH$_3$N, $^{13}$CH$_3$N, $^{13}$CH$_3$$^{15}$N, $^{12}$CH$_3$$^{15}$N, $^{12}$CD$_3$N, and $^{12}$CH$_2$DN; $^{12}$C$_2$H$_4$, $^{12}$C$_2$H$_2$D$_2$, two or more of $^{12}$CH$_4$, $^{12}$CD$_4$, $^{13}$CH$_4$, $^{13}$CD$_4$, and $^{12}$C$_2$H$_3$D, two or more of $^{13}$C$_2$H$_4$, $^{13}$C$_2$D$_4$, and $^{12}$C$_2$H$_3$D; $^{12}$C$_2$H$_6$, $^{13}$C$_2$H$_6$, and $^{12}$C$_2$D$_6$; and two or more of $^{32}$SF$_4$, $^{33}$SF$_4$, $^{34}$SF$_4$, and $^{36}$SF$_4$.

Illustrative examples of isotopes that can be enriched or separated by these methods include but are not limited to: $^{12}$C, $^{13}$C, and/or $^{14}$C; $^{28}$Si and $^{29}$Si, $^6$Li and $^7$Li; $^{10}$B and $^{11}$B, $^{36}$Ar and $^{40}$Ar; $^{22}$Ne and $^{20}$Ne; $^{24}$Mg and $^{26}$Mg; $^{124}$Xe, $^{129}$Xe, $^{131}$Xe, $^{132}$Xe, and $^{134}$Xe; and $^{78}$Kr, $^{82}$Kr, and $^{86}$Kr.

Example

In order to illustrate the methods, the sticking probabilities of CH$_4$, CD$_4$, and a mixture of CH$_4$ and CD$_4$ on condensed CH$_4$ and CD$_4$ surfaces. The sticking probabilities were measured using the King and Wells technique and the apparatus shown in FIG. 1.

This example illustrates how the isotopic sticking probability of CH$_4$ and CD$_4$ can be adjusted as a function of translational beam energy on CH$_4$ and CD$_4$ thin films under ultrahigh vacuum (UHV) conditions at low temperatures using the King and Wells method complemented by in situ infrared spectroscopic studies of gaseous condensation. (King, D. A. et al., *Surf. Sci.* 1972, 29, 454-482.) VENUS code molecular dynamics (MD) simulations show the same sticking probability differences between isotopologues as were observed in the gas-surface scattering experiments. Taken together, these results accurately and independently determine the sticking probability, allowing exploration of how differences in isotopic composition of the surface and incident molecular mass can impact the overall energy accommodation, and thus adsorption of the gaseous species onto the film.

Key to these studies was the use of essentially monoenergetic seeded supersonic beams so that the CH$_4$ and CD$_4$ had the same incident velocity but different kinetic energies and momenta. It was shown that as the incident velocity of CH$_4$ and CD$_4$ increased, the sticking probabilities for both molecules on a CH$_4$ condensed film decreased systematically, but that preferential sticking and condensation occurred for CD$_4$. These observations differed when condensed CD$_4$ was used as the target interface, demonstrating that the film's phonon and rovibrational densities of states and collisional energy transfer cross sections played a role in differential energy accommodation between isotopically substituted incident species. In addition, a mixture of gaseous CH$_4$ and CD$_4$ was grown on a methane thin film. While both species adsorbed creating a mixed isotopologue condensate, an increased abundance of CD$_4$ vs. CH$_4$ was also seen within the film as opposed to initial beam concentration. An isotopic enrichment for CD$_4$ was demonstrated in the mixed surface based on the difference in sticking probabilities between CH$_4$ and CD$_4$.

The studies reported here illustrate how differences in mass, energy, and surface composition can be adjusted to form a condensed surface film that absorbs and dissipates energy from impinging molecules or atoms to allow preferential adsorption of a selected isotopologue or isotope onto the film structure.

This example presents differential condensation between methane isotopologues under specifically selected substrate, gas-mixture, and incident velocity conditions. However, the demonstrated methods and outcomes can be used for the development of isotopic enrichment and separation techniques for a variety of isotopologues and/or isotopes.

Experimental Methods

All experiments were conducted in a molecular beam scattering instrument previously discussed in full detail. (Gibson, K. D. et al., *J. Chem. Phys.* 2011, 134, 034703\1-7.) Briefly, this instrument includes a UHV chamber with base pressures of $10^{-10}$ Torr connected to a triply differentially pumped molecular beamline. In the main chamber, a state-of-the-art closed-cycle helium-cooled sample manipulator (Advanced Research Systems) enabled precise and accurate temperature control of the Au(111) sample substrate between 16 and 800 K. The crystal was exposed to the impinging beam at normal incident angle and monitored in real time with optics for in situ reflection absorption infrared spectroscopy (RAIRS). Gas scattering and incident flux monitoring occurred with a residual gas analyzer (RGA).

All RAIR spectra were analyzed with Gaussian peak fitting atop cubic baselines. Spectra were acquired with a Nicolet 6700 infrared spectrophotometer (Thermo Fischer) using incident p-polarized IR radiation at an angle of 75° to the Au(111) crystal and a liquid nitrogen-cooled mercury cadmium telluride (MCT/A) detector. Each RAIR spectrum was an average of 25-200 scans taken using 4 cm$^{-1}$ resolution with a clean Au(111) sample used for the background correction.

CH$_4$ or CD$_4$ was dosed on the Au(111) substrate via beam deposition at 18 K prior to measurements at 20 K. Dosing conditions resulted in a deposition rate of 0.5 layers per second.

CH$_4$ and CD$_4$ beams were produced by expanding 1% CH$_4$ in H$_2$ or 1% CD$_4$ in H$_2$ at stagnation pressures of 150-400 psi through a 15 µm platinum pinhole. Resistively heating the beam nozzle from room temperature up to 1100 K resulted in beam velocities of up to 4600 m/s and rotationally cold molecules resulting from the seeded expansion. The translational energy distribution widths ($\Delta v/v$) ranged from 5 to 24%. It was noted that the velocity slip between the two isotopologues varied between 0 and at most 100 m/s with velocities spanning 2400 to 4600 m/s; therefore, the incident velocities of the two isotopologues were essentially identical for the purposes of a given experiment. Incident velocities were measured by time-of-flight methods using a mechanical chopper to modulate the beam prior to detection with an in-line quadrupole mass spectrometer. To confirm all the results and further understand phonon interactions at cold temperatures, a mixed beam was produced by expanding 1% CD4, 3% CH$_4$ in H$_2$.

Figure 2:
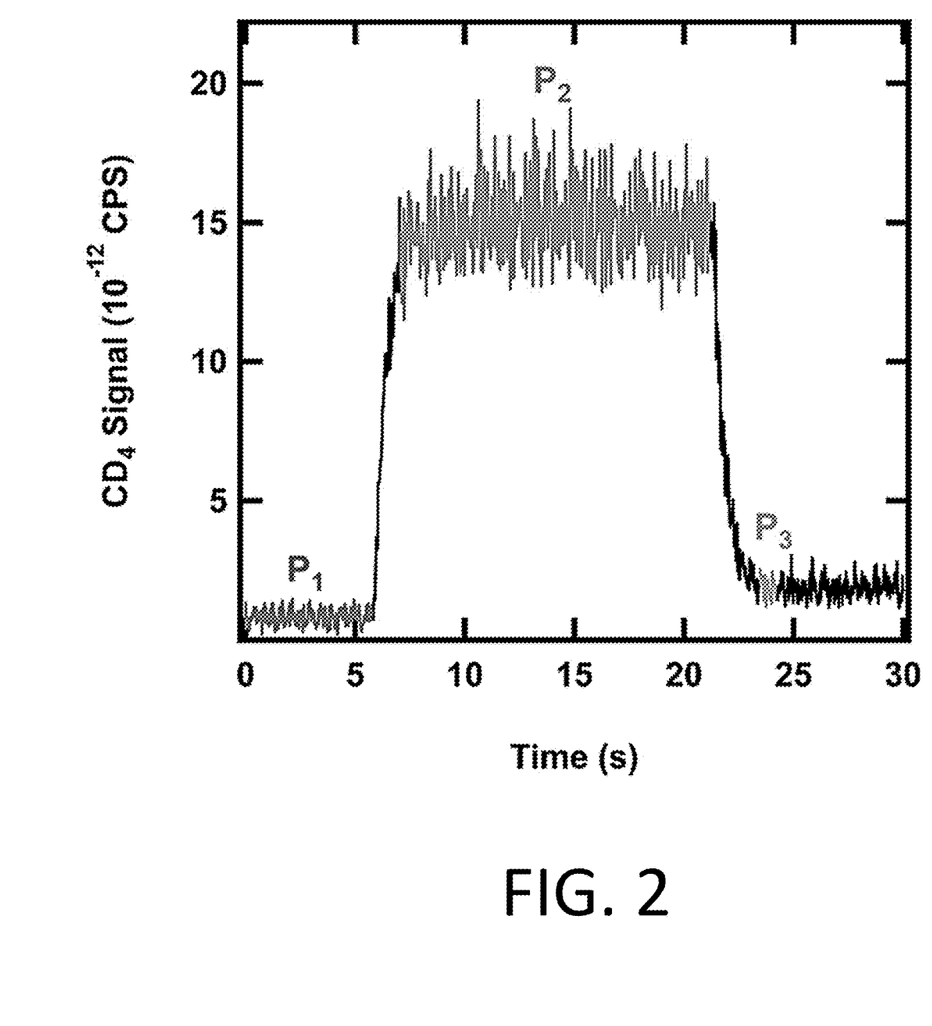
FIG. 2 shows a $CD_4$ signal (m/z=20) monitored with the RGA during a representative King and Wells experiment conducted on a $CH_4$ surface at 20 K. P1 is the background $CD_4$ signal; P2 is the full $CD_4$ flux with the flag blocking the Au substrate; P3 is the initial $CD_4$ adsorption without the flag. The incident gas mixture composition was 1% $CD_4$ in 99% $H_2$.

Sticking probability was determined using the King and Wells technique. (King, D. A. et al., *Surf. Sci.* 1972, 29, 454-482.) This was previously described in more detail for this system, and a typical King and Wells experiment conducted on a CH$_4$ surface temperature at 20 K is shown in FIG. 2 where m/z=20 for CD$_4$ was monitored as a function of time using an RGA out of line with the beam. (Thompson, R. S. et al., *J. Phys. Chem. C* 2019, 123, 17855-17863.) The experiment involved monitoring the background signal (P$_1$), indirect flux (P$_2$) with a flag in front of the substrate, and removal of that flag where molecules started to stick (P$_3$) to calculate the initial sticking probability:

$$S = \frac{(P_2 - P_3)}{(P_2 - 1)}$$

King and Wells measurements were performed at 20 K for all results presented in this example. This temperature was carefully chosen due to the methane surface interaction and the King and Wells method itself. UHV conditions at 20 K accurately model astrophysical chemistry rich environments such as dense molecular clouds. Additionally, at 20 K, multilayer CH$_4$ is stable on a gold substrate and frozen condensate films which enables measuring the condensate via RAIRS. (Collings, M. P. et al., *Astrophys. Space Sci.* 2003, 285, 633-659; and Ayotte, P. et al., *J. Geophys. Res. Planets* 2001, 106, 33387-33392.) The liquid helium cooling of the sample manipulator could impact the pumping speed and thus the reflected portion of the beam; therefore, all measurements were taken at a single sample temperature. This ensured that the unknown pumping speed remained consistent across measurements. Sticking probability was also calculated by using the initial CH$_4$ indirect flux instead of the value at saturation.

Results and Discussion

Figure 3:
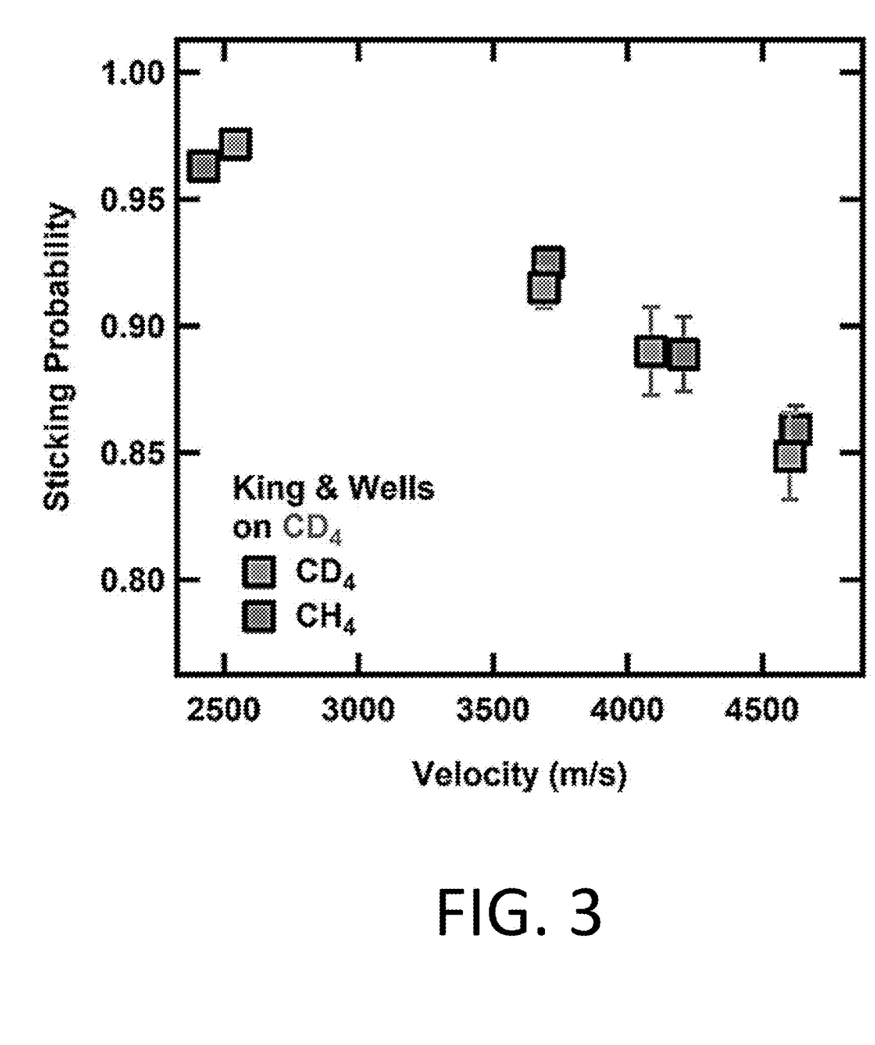
FIG. 3 shows sticking probabilities for $CH_4$ and $CD_4$ on a $CD_4$ film at 20 K. Sticking probability decreased with increasing velocity. Error bars represent the standard deviation of at least three measurements on at least three different days. Incident gas mixture compositions were either 1% $CD_4$ in 99% $H_2$ or 1% $CH_4$ in 99% Hz.

To fully demonstrate the role that mass matching and pre-adsorbed hydrocarbons play in trapping dynamics for $CH_4$ and $CD_4$, sticking probability data for $CH_4$ and $CD_4$ were obtained on top of amorphous $CH_4$ and $CD_4$. Films were grown for ~80 layers to achieve a film with a steady-state composition and self-similarity in film structure. The measured sticking probabilities for $CH_4$ and $CD_4$ on a $CD_4$ substrate are shown in FIG. 3. For physisorption trapping to occur, the $CH_4$ or $CD_4$ molecule must lose some initial kinetic energy when impinging upon the surface. If the energy loss is not efficient enough, the impactor molecule just bounces back. The sticking probability decreased with an increase in energy as more energy must be lost in the initial condensation in order for sticking to occur. The corrugation of the gas-surface potential for $CH_4$ and $CD_4$ was greater on the alkane-covered surface than it was on a bare metal substrate. Sticking probabilities were close to unity at low incident velocities for both incident isotopologues before decaying down to 0.85 for both $CH_4$ and $CD_4$. There was no strong variation in sticking probabilities between the $CH_4$ and $CD_4$ projectiles indicating, overall, very similar energy accommodation. This suggests that both phonon creation and translational to intramolecular energy transfer were essentially the same for both $CH_4$ and $CD_4$ on the condensed $CD_4$ film.

Figure 4:
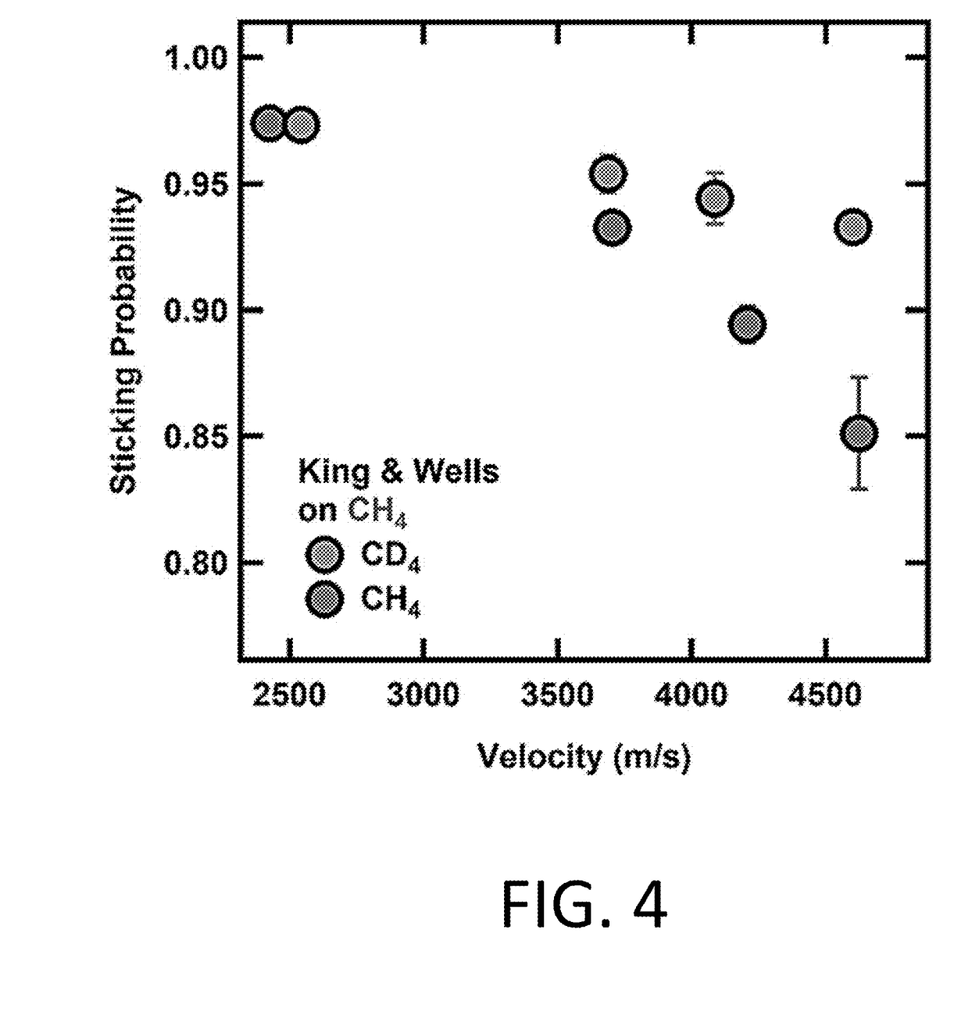
FIG. 4 shows sticking probabilities for $CH_4$ and $CD_4$ on a $CH_4$ film at 20 K. Sticking probability decreased with increasing velocity but remained higher for the $CD_4$ projectile. Error bars represent the standard deviation of at least three measurements on at least three different days. Incident gas mixture compositions were either 1% $CD_4$ in 99% Hz or 1% $CH_4$ in 99% Hz.
Figure 5A:
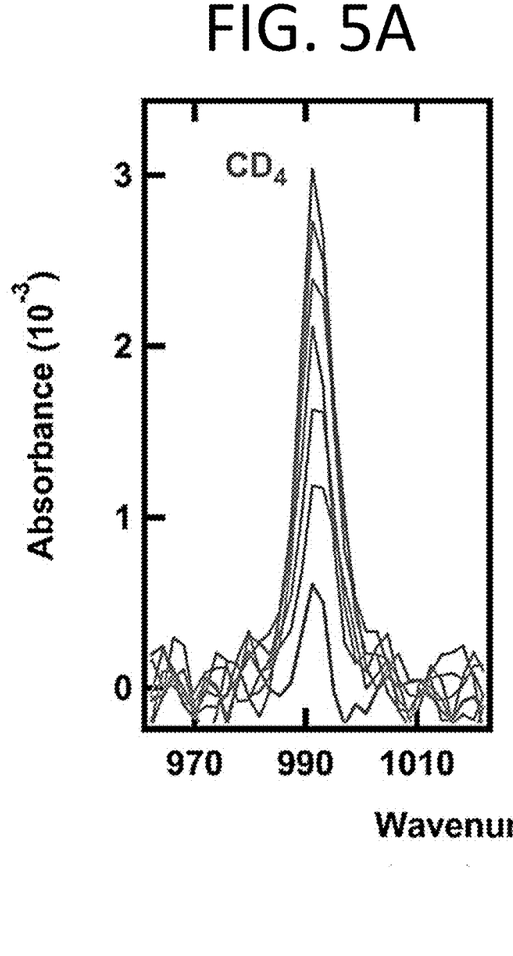
FIGS. 5A-5C show representative RAIR spectra of $CD_4$ (FIG. 5A) and $CH_4$ (FIG. 5B) $v_4$ bending mode as a function of exposure time for the highest energy beam (4600 m/s) on a $CH_4$ surface at 20 K. Spectra were taken ~ every 25 seconds (FIG. 5C) as a function of intensity to get the initial growth rate. Differences in sticking probability resulted in an increased amount of $CD_4$ on the surface and thus a higher growth rate.
Figure 5B:
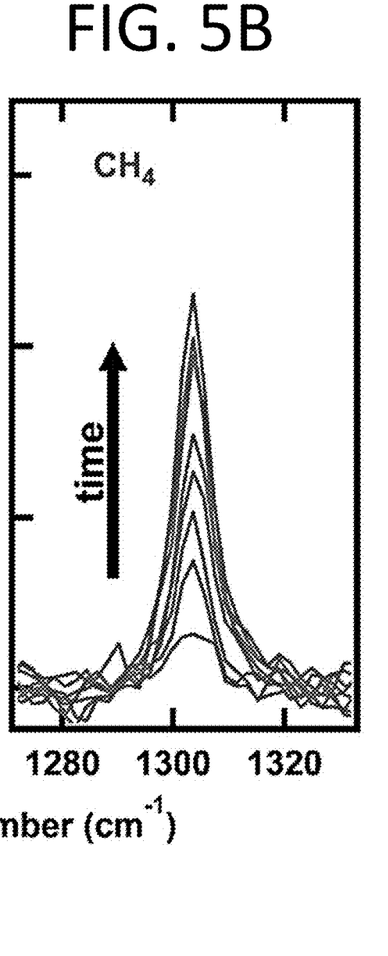
Figure 5C:
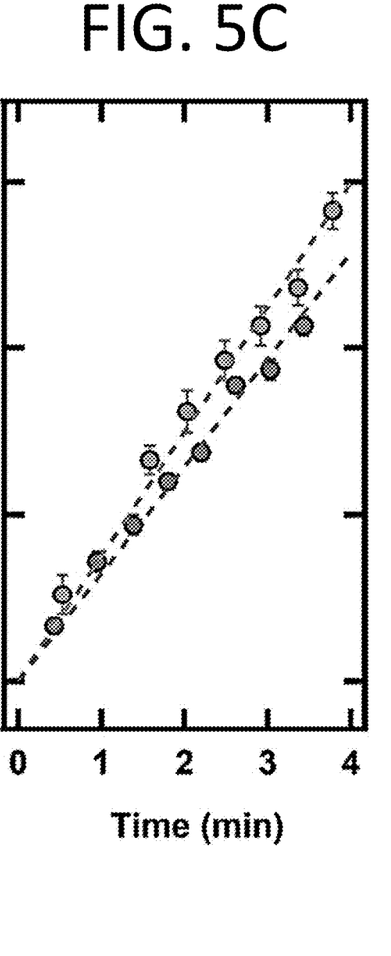
Figure 6:
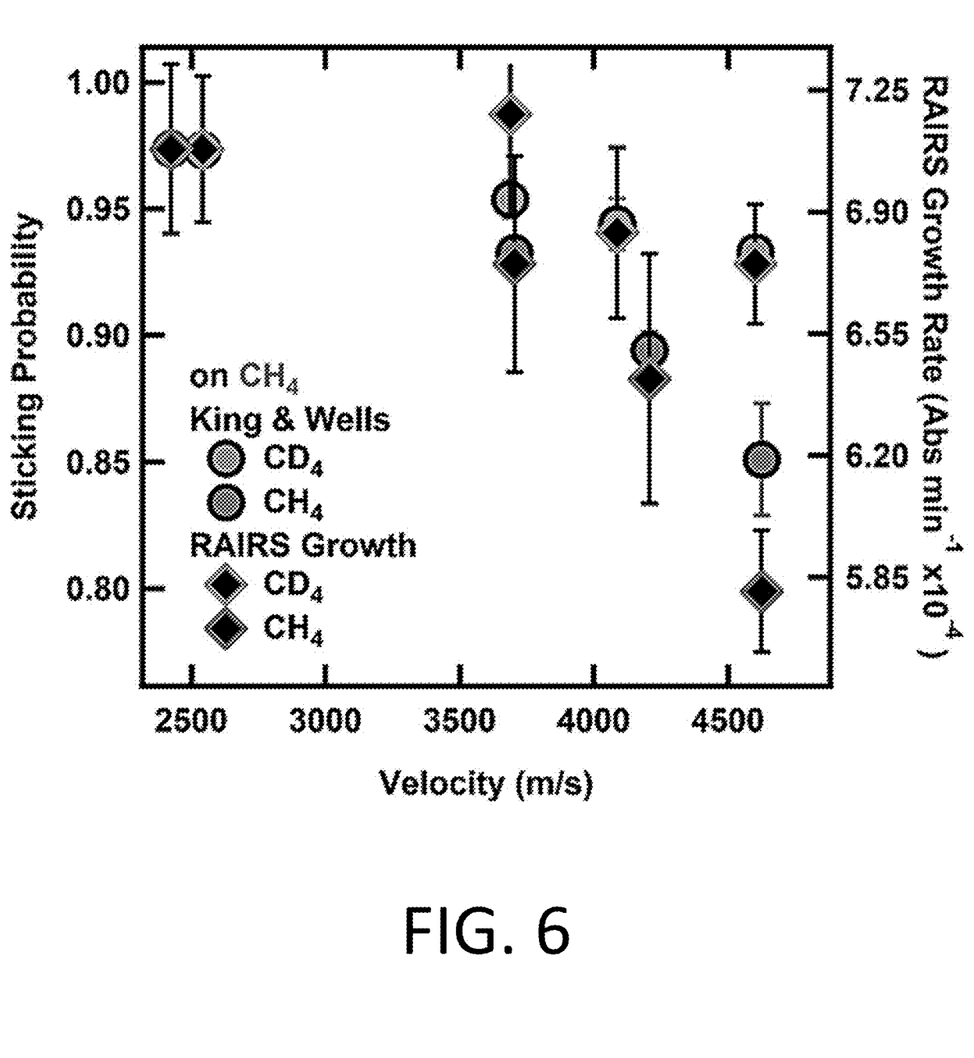
FIG. 6 shows confirmation of increased condensation of $CD_4$ on $CH_4$ in comparison with $CH_4$ on $CH_4$ as a function of incident methane velocity. Monitoring of the amount of adsorbed methane via the intensity of the $v_4$ bending mode for $CH_4$ and $CD_4$ by RAIRS, the initial growth rate was calculated to overlay with the sticking probability. Error bars represent the standard deviation of at least three measurements on at least three different days.

However, a higher sticking coefficient was noted for $CD_4$ on $CH_4$ ice than for $CH_4$ on $CH_4$ ice particularly at high incident translational energies, FIG. 4. The amount of adsorbed $CH_4$ and $CD_4$ was monitored via the intensity of the degenerate $v_4$ bending mode to calculate the initial growth rate. (Gálvez, Ó. et al., Astrophys. J. 2009, 703, 2101-2107; Hudson, R. L. et al., Phys. Chem. Chem. Phys. 2015, 17, 12545-12552; Grundy, W. M. et al., Icarus 2002, 155, 486-496; Drobyshev, A. et al., Low Temp. Phys. 2017, 43, 409-415; Chesters, M. A. et al., J. Electron Spectros. Relat. Phenomena 1990, 54-55, 739-748.) To ensure that these measurements were taken during an essentially constant film thickness regime, the IR measurements were completed by adding no more than an additional 0.75 MLs of condensate over the less than 4 minutes. As shown in FIGS. 5A-5C for $CH_4$ and $CD_4$ beams at 4600 m/s, sticking probability differences between the $CH_4$ and $CD_4$ resulted in a larger amount of $CD_4$ stuck on the surface after exposure and therefore a higher initial growth rate. Based on the total spectral intensity vs. time and thus, condensed projectile on the surface, the initial growth rate was calculated for each incident velocity. As a consistency check, at the end of the growth exposure, an additional King and Wells measurement was taken, which matched the initial sticking probability at the beginning. Taken together, this indicated that the coverage following the growth rate was not enough to change the underlying film structure and that RAIRS allowed for the determination of the amount of $CH_4$ or $CD_4$ on the surface. When overlaying this with the initial sticking probability, FIGS. 5A-5C, it was confirmed that both the King and Wells measurements and infrared spectroscopy of the condensate demonstrated an increased condensation of $CD_4$ on $CH_4$ compared to $CH_4$ on $CH_4$.

This isotopic effect increased with increasing translational energy. To understand this, the Baule model was examined, which predicts that a more efficient collision occurs when the gas and surface masses match due the singularity in the momentum case. (Kao, C. L. et al., Surf. Sci. 2004, 565, 70-80.) An incident molecule containing mass m and energy E encounters a square well potential of depth D and a surface species of mass M, resulting in an energy transfer (A) in the collision: (Carlsson, A. F. et al., Surf. Sci. 2000, 470, 62-80.)

$$\Delta = \frac{4mM(E+D)}{(M+m)^2}$$

For this, it was assumed that the energy of the incoming molecule is much greater than the well depth of the potential. Thus, for the $CH_4$ film, the energy transfer for the $CD_4$ projectile was greater than that of the $CH_4$, which would generally indicate a higher sticking probability. This model does not account for the density of states of the film or the internal modes of the molecule, as discussed later. These contributions can influence sticking probabilities. Due to the role of these molecular degrees of freedom, complex and multi-phonon interactions between the surface and the incident projectiles $CH_4$ film and $CD_4$ clearly need to be taken into consideration.

Figure 7:
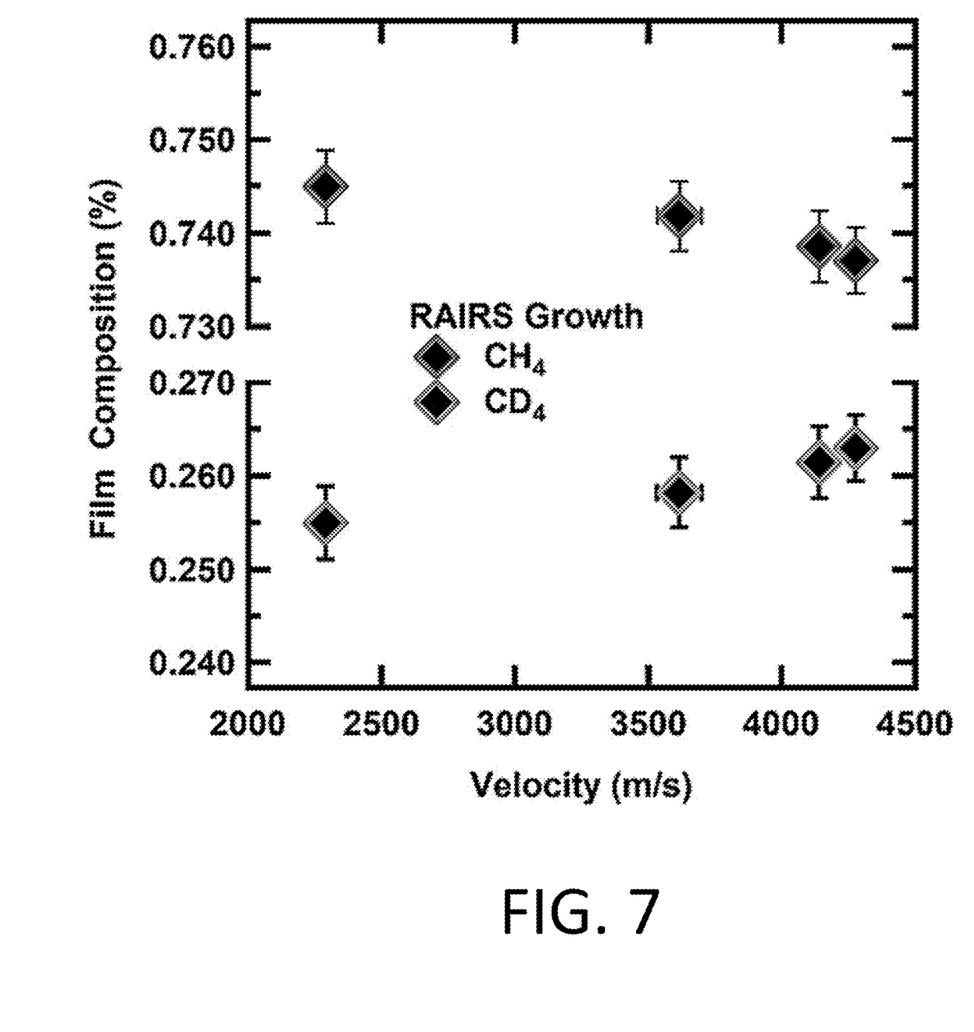
FIG. 7 shows an integrated area of the $v_4$ mode for $CD_4$ and $CH_4$, which demonstrates an enrichment of the heavier isotope ($CD_4$) into the mixed condensed film at higher beam velocities. Error bars represent the standard deviation of at least 35 steady-state films on at least three different days. Incident gas mixture composition: 3% $CH_4$, 1% CD4 and 96% Hz.

To further explore and confirm the experimental results, a beam comprised of both $CH_4$ and $CD_4$ in a 3:1 ratio was considered; this ratio was not selected to optimize condensation differences, but rather to demonstrate the robust nature of differential sticking. This allowed for the quantification of the sticking probability as well as condensate composition. While dosing a multilayer film of both $CH_4$ and $CD_4$ at 20 K, the integrated area of the degenerate $v_4$ mode was tracked over time using RAIRS. Once the condensate reached a self-similar structural steady state of at least 100 layers, at least 10 spectra per experiment on at least three different days were averaged to determine the film composition. As depicted in FIG. 7, the condensate composition for the room temperature beam (2200 m/s) was 74.5% $CH_4$ and 25.5% $CD_4$. However, as the beam velocities increased, the heavier isotope ($CD_4$) became preferentially adsorbed into the film. Due to increased adsorption into the film, the condensate film structure changed to 73.7% $CH_4$ and 23.6% $CD_4$. Overall, by measuring the condensate with RAIRS, it was confirmed that due to the increased sticking probability of $CD_4$ on a $CH_4$ film, an increased affinity for $CD_4$ was seen. It was demonstrated that for the fastest beam (4400 m/s), there was a 3.12±0.06% enrichment of $CD_4$ compared to the room temperature beam (2200 m/s). When taking the individual King and Wells values (FIGS. 3-4) and combining them with the film composition determined from the RAIR spectra, the sticking probabilities for $CH_4$ and $CD_4$ on the mixed film were calculated. For the highest velocity beam, these sticking probabilities also resulted in a $CD_4$ enrichment of 3.9%±0.02, indicating excellent agreement with the observed condensate enrichment.

CONCLUSION

The differential sticking probability of $CH_4$ and $CD_4$ on $CH_4$ and $CD_4$ condensates were examined using RAIRS for measuring on-surface gaseous condensation and complementary King and Wells mass spectrometry techniques for monitoring sticking probabilities. It was found that as the incident velocity of $CH_4$ and $CD_4$ increased (up to 4600 m/s), the sticking probability decreased for both films. Interestingly, it was concluded that preferential sticking and condensation occurred for $CD_4$ when striking the surface in comparison to the outcome for $CH_4$. This observation was confirmed both experimentally from infrared spectroscopy of the condensation and via mass spectrometric detection of the reflected molecules. Next, a mixed incident supersonic beam comprised of both $CH_4$ and $CD_4$ in a 3:1 ratio was employed to measure the condensate as well as the sticking probability. When doing so, the same effect was seen in the condensed mixed film, supporting an isotopic enrichment of the heavier isotope. These results are consistent with enhanced multi-phonon interactions attributable to the film's phonon and rovibrational densities of states and inelastic cross sections including intermolecular energy exchange between the incident $CD_4$ projectile and the $CH_4$ film, allowing for more efficacious gas-surface energy transfer.

This example demonstrates the importance of film structure and surface lattice coupling to allow for efficient energy transfer and an isotopic enrichment of the heavier isotope ($CD_4$). These results also offer a new route for isotope enrichment via the preferential condensation of heavier isotopes and isotopologues during gas-surface collisions under carefully selected substrate, gas-mixture, and incident velocity conditions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for enriching isotopologues or isotopes or for separating isotopologues or isotopes, the method comprising:
   forming a supersonic beam comprising: a mixture of a first isotopologue of a first molecule and a second, heavier isotopologue of the first molecule; or a first isotope of a first element and a second, heavier isotope of the first element;
   directing the supersonic beam onto the surface of a substrate to form a multilayered condensed film having a steady-state composition of the first and second isotopologues or the first and second isotopes, wherein the incident velocity of the supersonic beam and the ratio of the first and second isotopologues, or the ratio of the first and second isotopes, in the supersonic beam are selected such that the condensed film has a phonon density of states that results in preferential condensation of the second isotopologue or the second isotope, relative to the first isotopologue or the first isotope; and
   collecting the condensed isotopologues or the condensed isotopes from the condensed film.

2. The method of claim 1, wherein the supersonic beam comprises the mixture of the first isotopologue of the first molecule and the second, heavier isotopologue of the first molecule and further wherein the incident velocity of the supersonic beam and the ratio of the first and second isotopologues in the supersonic beam are selected such that the condensed film has the phonon density of states and a rovibrational density of states that result in the preferential condensation of the second isotopologue.

3. The method of claim 2, wherein the molar ratio of the second isotopologue to the first isotopologue in the supersonic beam differs from the naturally occurring molar ratio of the second isotopologue to the first isotopologue.

4. The method of claim 3, wherein the molar ratio of the second isotopologue to the first isotopologue in the supersonic beam is greater than the naturally occurring molar ratio of the second isotopologue to the first isotopologue.

5. The method of claim 4, wherein the molar ratio of the second isotopologue to the first isotopologue in the supersonic beam is at least ten times greater than the naturally occurring molar ratio of the second isotopologue to the first isotopologue.

6. The method of claim 4, wherein the molar ratio of the second isotopologue to the first isotopologue in the supersonic beam is at least one thousand times greater than the naturally occurring molar ratio of the second isotopologue to the first isotopologue.

7. The method of claim 1, wherein the supersonic beam comprises the mixture of the first isotope of the first atom and the second, heavier isotope of the first atom and the atomic ratio of the second isotope to the first isotope in the supersonic beam differs from the naturally occurring atomic ratio of the second isotope to the first isotope.

8. The method of claim 7, wherein the atomic ratio of the second isotope to the first isotope in the supersonic beam is greater than the naturally occurring atomic ratio of the second isotope to the first isotope.

9. The method of claim 7, wherein the atomic ratio of the second isotope to the first isotope in the supersonic beam is at least ten times greater than the naturally occurring atomic ratio of the second isotope to the first isotope.

10. The method of claim 7, wherein the first and second isotopes are isotopes of silicon.

11. The method of claim 7, wherein the first and second isotopes are isotopes of carbon.

* * * * *